June 11, 1935.  C. A. LAEMMEL  2,004,700
METHOD OF FORMING EYELETS ON MEAT SAWS AND THE LIKE
Filed Nov. 12, 1934
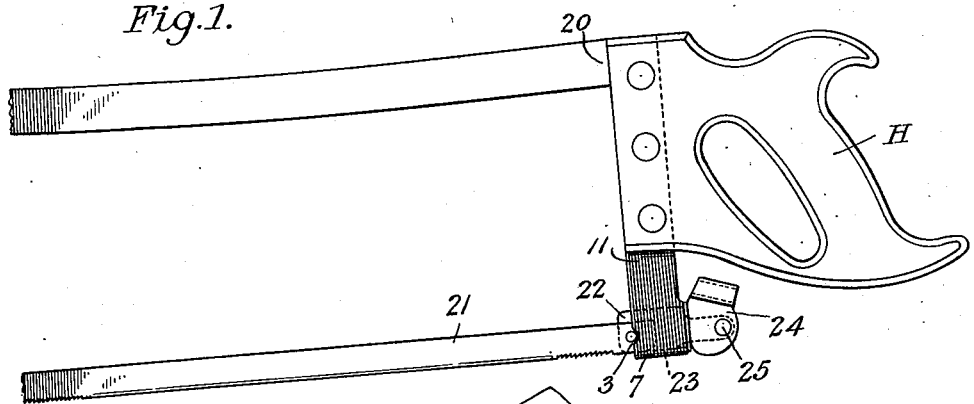
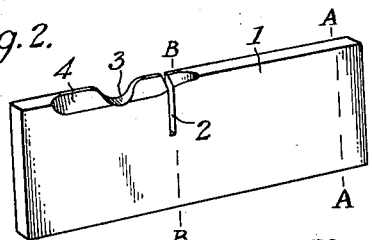
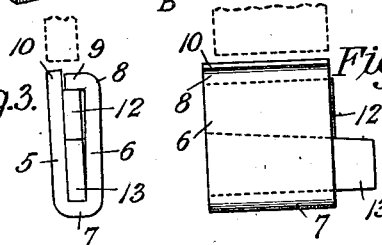 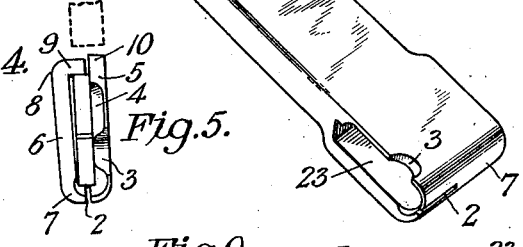 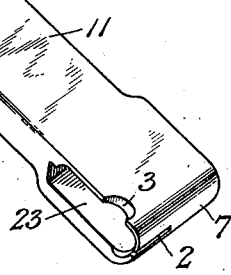
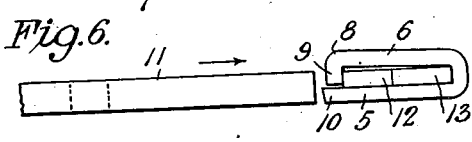 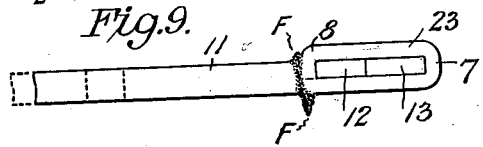
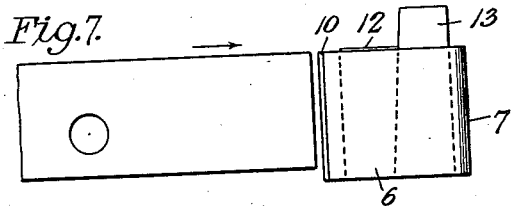 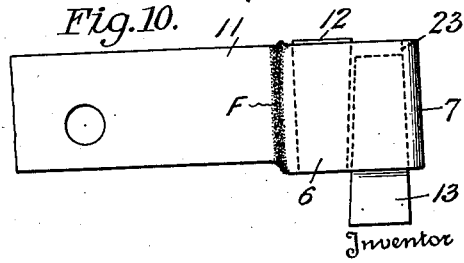
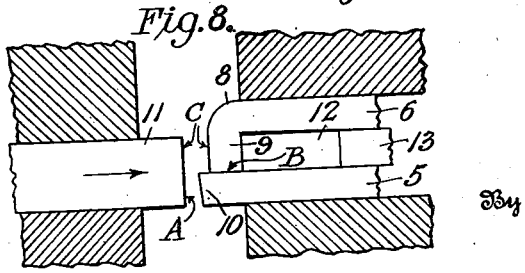
Inventor
CHARLES A. LAEMMEL
By Parker Cook,
Attorney Patented June 11, 1935

2,004,700

UNITED STATES PATENT OFFICE 2,004,700

METHOD OF FORMING EYELETS ON MEAT SAWS AND THE LIKE

Charles A. Laemmel, Brooklyn, N. Y., assignor to Atlantic Service Company, Inc., Brooklyn, N. Y., a corporation of New York Application November 12, 1934, Serial No. 752,733

7 Claims. (Cl. 76—112)

My invention relates to new and useful improvements in the method of welding the rear frame portion of meat saws and the like, and has for an object to construct the eyelet at the heel of the saw frame, so that the eyelet will not only become serviceable in nature but will also become an integral part of the rear frame of the hack saw.

It might be mentioned here briefly that heretofore in forming the eyelet at the heel of the butcher's or meat saw frame, it was accomplished by simply utilizing a piece of flat sheet metal or strap, which was bent back on itself and then riveted to the frame, with the result that the eyelet at the end of the frame was bulky, heavy, and accumulated meat and fat. Furthermore, it was exceedingly hard to clean or keep clean, as rough edges and ridges were present. Besides this, even the rivets in some cases had a tendency to loosen under strain and the saw frame had to be repaired.

It is well known that saw frames, especially butchers' saw frames, to perform satisfactorily must be heat-treated, so that they may retain the proper tension on the blades. In the previous method, in riveting on the clamp to form the eye, the purpose of which will be shortly mentioned, this heat-treating had to be performed before attaching the strap or eye, because if it were riveted on first, expansion and contraction occurring in the heat-treating would tend to loosen the rivets.

One of the objects, therefore, of the present invention is to weld to the rear frame of the saw the eyelet or eye, in a certain manner hereinafter to be described, and then to grind off the flashings, so that the eye now appears, and is substantially, an integral part of the frame.

Another object of the invention is to provide a method wherein this eye is welded to the frame, which eye becomes an integral part of the frame, and may be heat-treated with the frame as one piece of steel to thus become as hard as the rest of the frame.

Still another object of the invention is to provide a method for forming this eye, which does away with the cost of drilling the frame and eye, does away with the countersinking, removing the drilling burs, and also eliminates the riveting and grinding of the rivet heads.

Still another object of the invention is to provide a method of forming the rear frame of a butcher's saw or hack saw that will be stronger than the frames as now made and also lighter in weight.

Still another object of the invention is to provide a method of forming the eye wherein at first one leg of the eye will be slightly greater in length than the adjacent leg, so that a perfect fusion may take place when welded by the flash method.

Still another object of the invention is to provide a method of forming eyes wherein the eye may become substantially an integral part of the article to which it is attached and wherein weight and labor may be saved.

With these and other objects in view, the invention consists in certain new and novel features and combination of parts, as will be hereinafter more fully explained and pointed out in the claims.

Referring now to the drawing showing a preferred embodiment,

Fig. 1 is a fragmentary side view of a butcher's saw, the heavily shaded lines showing the lower portion of the rear frame to which has been welded an eye;

Fig. 2 is a detail of the eye in its blank form and before being bent;

Fig. 3 is an end view of the same after the blank has been bent on the lines A—A and B—B of Fig. 2 and showing what I term a pilot in position;

Fig. 4 is a similar side view of the same;

Fig. 5 is a view similar to Fig. 3 but from the opposite end;

Fig. 6 is a detail edge view showing the eye in relative position to the frame to which it is to be welded;

Fig. 7 is a top plan view of Fig. 6;

Fig. 8 is an enlarged fragmentary view of the frame and the eye being clamped in a welding machine, the parts ready to be welded;

Fig. 9 is an edge view of the frame after the eye has been welded and showing the flashings about the weld;

Fig. 10 is a top plan view showing one piece of the pilot being partly driven from position; and Fig. 11 is an enlarged perspective showing the frame and eye as substantially integral.

Referring now for the moment to Fig. 1, there is fragmentarily shown a butcher's saw including a handle H which is riveted to a rear leg or frame 11, while extending outwardly from the handle may be seen the top portion 20 of the frame which is secured to the frame 11 by welding, but the welding at this point forms no part of the present invention.

There may also be seen (fragmentarily) a removable blade 21 which is secured to a bolt 22 which passes through an eyelet 23, the method of making this eyelet forming the gist of the present invention.

Secured to the bolt 22 is a small cam 24, which is pivoted, as at 25, so that an operation of this cam by a handle (not shown) tightens or relieves the tension on the blade 21.

Referring now more particularly to the manner in which the improved method is carried out, that is, the method of welding the eyelet 23 to the portion of the frame 11, so that the eyelet is substantially an integral part of the frame member 11, it will be noticed, by referring to Fig. 2, that there is shown a blank 1 which is cut from stock and this blank 1 is preferably cut or slotted, as at 2, approximately centrally of its length and is also notched, as at 3, and beveled slightly, as at 4. These blanks are formed in a punch-press with dies conforming to standard practice.

The blank is next bent along lines A—A and B—B of Fig. 2, so that the blank now is in the form of an eye (incomplete) having the legs 5 and 6, the central bend occurring, as at 7, and the leg 6 being further bent, as at 8, to provide what might be termed the cross bar 9.

It will be noticed that the end 10 of the leg 5 extends in a plane above that of the outer surface of the cross bar 9 and this is of extreme importance. I have found by many trials that the length of this leg which projects above the plane of its adjacent cross bar should be substantially the amount that I have shown in Figs. 3, 4, 5, 6 and 8.

It will also be noticed from Fig. 8 that the weld by the flash method will take place at three places when the eye at welding temperature is forced into contact with the end of the frame 11, to wit, first a weld will theoretically take place between A and the end 10 of the leg 5, then at B, where the cross bar 9 contacts with the inner edge of the leg 5, and then at C, that is, between the outer surface of the cross bar 9 and with the remaining portion of the end 11 of the bar.

It will be understood that in flash-welding, the welding occurs so rapidly that it appears to be a simultaneous action but, as heretofore mentioned, the metal, in reality, flashes in the progressive manner set forth.

Also, it is to be understood that the pieces, that is, the frame 11 and the clamp or eye 23 formed of the blank 1, are tightly clamped to the electrodes (not shown) of the welder, and considerable pressure is applied in bringing the two parts together when they attain the welding temperature, and this temperature is the melting point of the metal itself.

Now, I have found that means must be provided to prevent the collapse of the eye 23, and to prevent this collapse and to insure the necessary accurate dimensions and shape of the eye, I insert a pilot within the eye, which is formed of the two parts 12 and 13. These two pieces are tapered throughout their length, so that they may be driven within the eye and also may be quickly driven from the eye by knocking out one of the two pieces to thus allow the remaining piece to fall from the eye. This pilot, as before mentioned, is made up of two pieces and these pieces are made of tungsten steel and hardened, so that they have a much higher melting point than the metals that are being welded. Consequently, the pilot will never weld itself within the eye.

Thus, it will be seen that by utilizing a pilot of two tapering pieces, when the two ends are flush the proper width and, of course, the proper thickness of the eye are assured, regardless of the clamping pressure, the welding pressure, and the melting temperature of the piece of the frame and the eye that are under formation.

After the welding operation has taken place, the pilot being made of two tapering pieces may be readily removed by tapping, and one piece will then fall into a container of cold water (not shown).

Another important function of the pilot is that the flashings during the welding operation cannot form within the eye 23, as the pilot occupies this space. Flashings, of course, will appear, as at F, externally of the eye and its cooperative frame portion 11 but these flashings being external ones may be readily removed by grinding, as may be seen in Fig. 11. If it were not for the use of this pilot, the flashings would occur within the eye (if the same had not melted in the process) and it would be an extremely difficult matter to afterwards clean out the eye.

Still another function of providing a pilot of this nature is that its being a conductor may also assist in properly distributing the welding current.

From the foregoing it will be seen that I have produced a method wherein the rear frame portion and heel of a hack saw may be constructed of two parts, that is, the frame portion and an eye, but after welding these parts will be substantially of an integral nature. Also, the eye will not only be of a neat appearance but will be lighter and stronger than where an eye is merely riveted to the frame.

I have found in the building of a number of these saws that the method above-outlined has proved highly successful, both from the standpoint of welding operations and from a commercial standpoint.

It will be understood that although I have shown the method as carried out in conjunction with the manufacture of a butcher's saw, it will be readily apparent that wherever an eye of a similar nature is needed, it might be welded by the same manner to a frame other than a butcher's saw frame.

Finally, it will be appreciated that by utilizing the method above set forth, that is, butt-welding the eye and then grinding the same, will provide a much neater appearance as the metal frame and eye now appear as one piece, and furthermore considerable labor and manufacturing steps are saved and from a utilitarian point the eye will be much stronger than if it were simply a strap riveted to the frame, as heretofore has been the practice.

Having thus described my invention, what I claim as new and desire to secure by Letters Patent is:—

1. The method of forming an eye on a saw frame, which consists in folding a blank back on itself and then bending the end of one leg of the blank toward the other leg of the blank and leaving one leg of the blank longer than the other, placing a piece of metal within the eyelet of a higher fusing point than the metal of the blank and frame, butt-welding the eyelet to the frame, removing the piece of metal from the eyelet, and grinding the flashings from about the points of juncture.

2. The method of forming an eyelet on a portion of a saw frame, which includes folding a blank back on itself and then bending the end of one leg toward the other leg to leave one leg slightly longer than the other, placing a metal pilot within the eyelet which pilot has a higher fusing point than the metal in the blank and the frame, electrically flashing the eyelet and frame under pressure to its melting point, removing the pilot from the eyelet, and grinding the flashings from the juncture of the eyelet and frame.

3. The method of forming the heel portion of a meat saw frame, which includes the cutting of a blank in the form of an eyelet or loop, one leg of the eyelet projecting slightly above the adjacent metal of the eyelet, placing a pilot within the eyelet before welding the same to the frame, the fusing point of the pilot being higher than the fusing point of the eyelet and the frame, subjecting the eyelet and frame to a butt-welding operation, removing the pilot, and grinding the flashings from the exterior surface of the eyelet and frame.

4. The method of forming a substantially integral eye on a portion of a saw frame, which includes bending a blank substantially in the shape of an eyelet and wherein one leg of the blank extends slightly above the plane of the outer edge of the other leg, clamping a metal block within the eyelet which has a higher fusing point than the eyelet itself, butt-welding by the flash method the eyelet to the frame, removing the metal from within the eyelet which has retained its original form, and grinding off the flashings at the points of juncture between the frame and the eyelet.

5. The method of forming an eyelet at the heel of a hack saw, which includes the bending of a blank back on itself and then bending one leg toward the remaining leg to thereby provide a space between the two legs and leaving one leg slightly longer than the other leg, tightly clamping a two-piece metal pilot, the fusing temperature of which is greater than the fusing point of the eyelet, within the eyelet to completely fill the space formed in the metal blank, subjecting the eyelet with its long leg to the portion of the frame to which it is to be welded to a butt-welding operation, removing the pilot, the interior of the eyelet being free from flashings, and subjecting the now fused eyelet and portion of the frame to a grinding operation to remove the flashings exteriorly of the eyelet and the adjacent portion of the saw frame.

6. The method of forming the heel of a hack saw, which includes the bending of a blank to substantially U-shape and closing the eye of the U by a further bending of the metal and leaving one leg slightly longer than the other, filling the space with a pilot whose fusing point is greater than that of the blank, the said pilot also being formed of two tapering pieces, subjecting the frame and the eyelet to a butt-welding operation under pressure and at a fusing temperature to thereby cause the eyelet to be welded to the frame, knocking out one piece of the pilot so that the other piece may also readily drop therefrom, and subjecting the frame with the now integral eyelet to a grinding operation.

7. The method of forming the heel of a hack saw, which includes the bending of a blank to substantially U-shape, closing the top of the U by a further bending of one leg of the U and leaving one leg slightly longer than the other, filling the space of the U-shaped blank with a pilot whose fusing point is greater than that of the blank, subjecting a portion of the frame and the U-shaped blank to a welding pressure and temperature whereby theoretically the eyelet will progressively fuse first between the end of the long leg and the frame, second between the two legs of the blank, and third between the end of the remaining leg of the blank and the frame, removing the pilot, and grinding the flashings from the points of juncture between the eyelet and the frame.

CHARLES A. LAEMMEL.